(12) United States Patent
Freer

(10) Patent No.: US 12,270,332 B1
(45) Date of Patent: Apr. 8, 2025

(54) HYBRID-ELECTRIC AIRCRAFT PROPULSION SYSTEM CONTROL SYSTEM AND METHOD

(71) Applicant: Pratt & Whitney Canada Corp., Longueuil (CA)

(72) Inventor: Richard Freer, St-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/373,237

(22) Filed: Sep. 26, 2023

(51) Int. Cl.
  *F02C 3/10* (2006.01)
  *B64D 27/02* (2006.01)
  *B64D 27/24* (2024.01)
  *F01D 15/10* (2006.01)

(52) U.S. Cl.
  CPC ................ *F02C 3/10* (2013.01); *B64D 27/24* (2013.01); *F01D 15/10* (2013.01); *B64D 27/026* (2024.01); *F05D 2220/323* (2013.01); *F05D 2220/76* (2013.01); *F05D 2260/4031* (2013.01); *F05D 2270/053* (2013.01)

(58) Field of Classification Search
  CPC ...................................... F02C 3/10; F02C 7/36
  See application file for complete search history.

(56) References Cited

U.S. PATENT DOCUMENTS

| | | | | |
|---|---|---|---|---|
| 8,615,980 | B2* | 12/2013 | Agrawal | F02C 6/206 244/17.23 |
| 8,876,462 | B2* | 11/2014 | Balk | B64C 11/48 415/70 |
| 10,738,710 | B2* | 8/2020 | Sidelkovskiy | F02C 7/36 |
| 11,725,594 | B2* | 8/2023 | McQuiston | F02K 3/04 60/773 |

(Continued)

FOREIGN PATENT DOCUMENTS

WO  2022123158 A1  6/2022

OTHER PUBLICATIONS

"VFD Fundamentals," https://controltrends.org/wp-content/uploads/2010/10/VFFundamentals.pdf, Kilowatt classrooms, downloaded Apr. 9, 2024. (Year: 2003).*

(Continued)

*Primary Examiner* — David P. Olynick
(74) *Attorney, Agent, or Firm* — Getz Balich LLC

(57) ABSTRACT

A hybrid-electric propulsion (HEP) system is provided that includes a gas turbine engine, an electrical power motive system, a system controller, and a propulsor. The gas turbine engine has a free turbine configuration and a compressor. The electrical power motive system has first and second electric motors and first and second inverters. The gas turbine engine provides motive force to the propulsor. The first electric motor is configurable in a drive mode or in generator mode. The second electric motor is in communication with the compressor. The system controller is in communication with the gas turbine engine, the first and (Continued)

second inverters, and a non-transitory memory storing instructions, which instructions cause the system controller to control the second inverter to operate the second electric motor to provide a motive force to the compressor of the gas turbine engine during a low power setting of the gas turbine engine.

20 Claims, 2 Drawing Sheets

(56) References Cited

U.S. PATENT DOCUMENTS

| | | | | |
|---|---|---|---|---|
| 2006/0225431 | A1* | 10/2006 | Kupratis | F01D 15/10 60/39.24 |
| 2008/0143115 | A1* | 6/2008 | Kern | F02C 7/32 290/52 |
| 2009/0193785 | A1* | 8/2009 | Siden | F02C 3/10 60/39.15 |
| 2010/0058731 | A1 | 3/2010 | Haehner | |
| 2010/0219779 | A1 | 9/2010 | Bradbrook | |
| 2010/0251726 | A1* | 10/2010 | Jones | F02C 7/32 60/773 |
| 2014/0283519 | A1 | 9/2014 | Mariotto | |
| 2017/0044989 | A1* | 2/2017 | Gemin | F02C 7/32 |
| 2017/0226934 | A1* | 8/2017 | Robic | F04D 27/0269 |
| 2017/0284411 | A1* | 10/2017 | Bentley | F01D 5/06 |
| 2018/0163558 | A1* | 6/2018 | Vondrell | F16D 41/069 |
| 2018/0216537 | A1* | 8/2018 | Greenberg | F02C 9/18 |
| 2018/0251226 | A1* | 9/2018 | Fenny | B64C 29/0033 |
| 2020/0056497 | A1* | 2/2020 | Terwilliger | F01D 13/00 |
| 2020/0277061 | A1* | 9/2020 | Becker | B60L 50/16 |
| 2020/0298988 | A1* | 9/2020 | LaTulipe | B64D 35/08 |
| 2021/0237887 | A1 | 8/2021 | Besse | |
| 2021/0340908 | A1* | 11/2021 | Boucher | F02C 7/224 |
| 2022/0074349 | A1* | 3/2022 | Valois | F02C 3/10 |
| 2022/0204171 | A1 | 6/2022 | Veilleux, Jr. | |
| 2022/0388673 | A1 | 12/2022 | Thiriet | |
| 2023/0234715 | A1* | 7/2023 | Hickey | H02J 7/34 244/53 R |
| 2024/0034479 | A1* | 2/2024 | Detweiler | B60L 3/0046 |

OTHER PUBLICATIONS

Madonna, et al. "Electrical Power Generation in Aircraft: Review, Challenges, and Opportunities," IEEE Transactions on Transportation Electrification, vol. 4, No. 3, Sep. 2018. (Year: 2018).*

Bolam, et al., "Review of Electrically Powered Propulsion for Aircraft," Conferenc Sep. 2018, 978-1-5386-2910-9/18 © 2018 IEEE (Year: 2018).*

EP Search Report for EP Patent Application No. 24203010.4 dated Feb. 11, 2025.

* cited by examiner

HYBRID-ELECTRIC AIRCRAFT PROPULSION SYSTEM CONTROL SYSTEM AND METHOD

BACKGROUND OF THE INVENTION

1. Technical Field

The present disclosure relates to methods and apparatus for control systems and method for a gas turbine engine in general, and to methods and apparatus for control systems and method for a gas turbine engine operating in a low power setting in particular.

2. Background Information

Conventional gas turbine engines operating in a low power setting portion of a flight program (e.g., descent) very often suffer from a very inefficient fuel burn rate. In addition, for many gas turbine engines, the rate of power increase is slower/more limited at low engine power, as compared to the rate of power increase possible at high engine power. Improvements in efficiency at low power settings and improvements in the rate of power increase at a low engine power setting would be desirable.

SUMMARY

According to an aspect of the present disclosure, a hybrid-electric propulsion (HEP) system is provided that includes a gas turbine engine, an electrical power motive system, a system controller, and a propulsor. The gas turbine engine has a free turbine configuration that includes a compressor. The electrical power motive system has first and second electric motors and first and second inverters. The gas turbine engine is configured to provide motive force to the propulsor. The first electric motor is configurable in a drive mode to provide motive force to the propulsor or in generator mode to produce electrical energy. The second electric motor is in communication with the compressor. The system controller is in communication with the gas turbine engine, the first and second inverters, and a non-transitory memory storing instructions, which instructions when executed cause the system controller to control the second inverter to operate the second electric motor to provide a motive force to the compressor of the gas turbine engine during a low power setting of the gas turbine engine.

In any of the aspects or embodiments described above and herein, the gas turbine engine and the first electric motor may be disposed in a parallel configuration.

In any of the aspects or embodiments described above and herein, the HEP system may further include a reduction gear box and in the parallel configuration both the gas turbine engine and the first electric motor are in communication with the reduction gear box.

In any of the aspects or embodiments described above and herein, the instructions when executed may cause the system controller to control the first inverter to operate the first electric motor in the generator mode when the second inverter is controlled to operate the second electric motor to provide motive force to the compressor of the gas turbine engine.

In any of the aspects or embodiments described above and herein, the gas turbine engine has a first rate of power increase at the low power setting without the motive force from the second electric motor and has a second rate of power increase at the low power setting with the motive force from the second electric motor, wherein the second rate of power increase may be greater than the first rate of power increase.

In any of the aspects or embodiments described above and herein, the gas turbine engine has a first rate of power increase limit between an engine acceleration request and an engine response to the request during the low power setting without the motive force from the second electric motor, and a second rate of power increase limit between the engine acceleration request and the engine response to the request during the low power setting with the motive force from the second electric motor, wherein the first rate of power increase limit may be greater than the second rate of power increase limit.

In any of the aspects or embodiments described above and herein, wherein the HEP system may include an accessory gearbox (AGB) in communication with the compressor of the gas turbine engine and the second electric motor.

In any of the aspects or embodiments described above and herein, the gas turbine engine may include a high-pressure turbine, a power turbine, and a first shaft connecting the compressor to the high-pressure turbine and the AGB is in communication with the first shaft.

In any of the aspects or embodiments described above and herein, the gas turbine engine may include a second shaft connected to the power turbine, and the first electric motor is in communication with the second shaft.

In any of the aspects or embodiments described above and herein, the gas turbine engine has an axial centerline and the high-pressure turbine, a power turbine, the first shaft, and the second shaft may be rotatable about the axial centerline.

According to an aspect of the present disclosure, a method of controlling a hybrid-electric propulsion (HEP) system is provided. The HEP system includes a gas turbine engine having a free turbine configuration that includes a compressor, an electrical power motive system having a first and second electric motors, first and second inverters, and a propulsor. The second electric motor is in communication with the compressor. The method includes: controlling the gas turbine engine to provide motive force to the propulsor; controlling the first electric motor to operate in a first mode providing motive force to the propulsor or to operate in a second mode not providing motive force to the propulsor; controlling the first electric motor to provide motive force to the propulsor or to not provide motive force to the propulsor; and controlling the second electric motor to provide motive force to the compressor of the gas turbine engine during a low power setting of the gas turbine engine.

In any of the aspects or embodiments described above and herein, in the second mode the first electric motor may operate as an electrical generator producing electrical energy.

In any of the aspects or embodiments described above and herein, the first electric motor may be controlled to operate in the second mode when the second electric motor is controlled to provide motive force to the compressor of the gas turbine engine during the low power setting of the gas turbine engine, wherein the electrical energy produced by the first electric motor is available for use by the second electric motor.

In any of the aspects or embodiments described above and herein, the HEP system may include a reduction gear box and the gas turbine engine and the first electric motor may be in communication with the reduction gear box, and may be disposed in a parallel configuration.

In any of the aspects or embodiments described above and herein, the gas turbine engine has a first rate of power increase during the low power setting without the motive force from the second electric motor and has a second rate of power increase during the low power setting with the motive force from the second electric motor, wherein the second rate of power increase may be greater than the first rate of power increase.

In any of the aspects or embodiments described above and herein, the gas turbine engine has a first lag between an engine power increase request and an engine response to the power increase request during the low power setting without the motive force from the second electric motor, and a second lag between the engine power increase request and the engine response to the power increase request during the low power setting with the motive force from the second electric motor, wherein the first lag is greater than the second lag.

In any of the aspects or embodiments described above and herein, the gas turbine engine may include a high-pressure turbine, a power turbine, and a first shaft connecting the compressor to the high-pressure turbine and the AGB is in communication with the first shaft.

In any of the aspects or embodiments described above and herein, in the second mode the first electric motor may operate as an electrical generator producing electrical energy, and the method may include controlling the first electric motor when operating in the second mode to generate a total amount of electrical energy greater than an amount of electrical energy used by the second electric motor, and a providing a difference in electrical energy between the total amount of electrical energy and the amount of electrical energy used by the second electric motor to an electrical energy storage device.

In any of the aspects or embodiments described above and herein, the method may include controlling the first electric motor operating in second mode to begin operating in the first mode when a propulsor power increase request is made.

In any of the aspects or embodiments described above and herein, the method may include providing electrical energy from an electrical energy storage device to both the first inverter and second inverter simultaneously.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
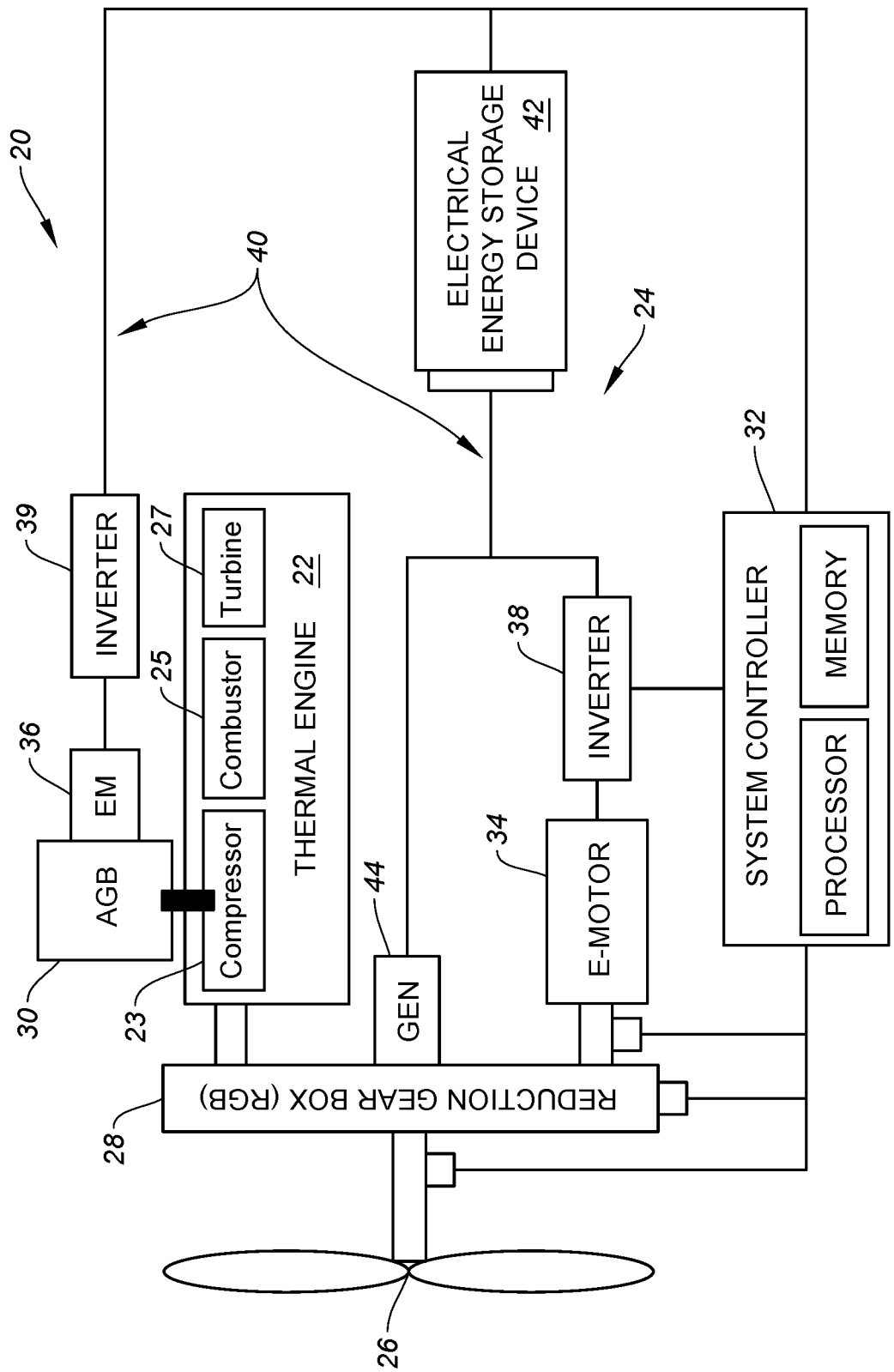
FIG. 1 is a diagrammatic view of a present disclosure hybrid-electric propulsion system embodiment.

The present disclosure is directed to a hybrid-electric propulsion system ("HEP system 20") and method for powering an aircraft. The aircraft may be a fixed-wing aircraft, a rotary-wing aircraft (e.g., a helicopter), a tilt-rotor aircraft, a tilt-wing aircraft, or any other aerial vehicle. The aircraft may be a manned aerial vehicle or an unmanned aerial vehicle (UAV, e.g., a drone).

As will be detailed herein, present disclosure HEP systems 20 include a gas turbine engine 22, an electrical power motive system 24, and a propulsor 26, and the present disclosure system 20 can be configured in a variety of different embodiments. The gas turbine engine 22 may take the form of a turboprop engine, a turboshaft engine, a turbojet engine, a propfan engine, or an open rotor engine, or the like. The gas turbine engine 22 may have a "free turbine" configuration. The propulsor 26 may be any type of device (e.g., propellers, fan blades, rotor blades for a helicopter, a tilt-rotor aircraft, or a tilt-wing aircraft) that can be rotated to provide motive thrust. To facilitate an understanding of the present disclosure, exemplary embodiments of present disclosure HEP systems 20 are diagrammatically shown in FIGS. 1 and 2. The present disclosure is not limited to these examples.

FIG. 1 diagrammatically illustrates an HEP system 20 embodiment that includes a gas turbine engine 22, a reduction gear box (RGB) 28, an accessory gearbox (AGB 30), an electrical power motive system 24, a system controller 32, and a propulsor 26. The gas turbine engine 22 includes a compressor 23, a combustor 25, and a turbine 27. To be clear, the gas turbine engine is shown diagrammatically in FIG. 1 as having a compressor 23, a combustor 25, and a turbine 27. The gas turbine engine 22 is not limited to these components; e.g., the turbine section may include a high-pressure turbine, a power turbine, etc. As indicated above, the gas turbine engine 22 may assume a variety of different configurations. In the HEP system 20 embodiment shown in FIG. 1, the gas turbine engine 22, a first electric motor 34, and the RGB 28 are arranged in a parallel configuration. The parallel configuration is a non-limiting example of an acceptable present disclosure HEP system 20 configuration. As will be detailed hereinafter and shown in FIG. 2, the present disclosure HEP system 20 is not limited to a parallel configuration. In the HEP system 20 embodiment shown in FIG. 1, either the gas turbine engine 22 or the first electric motor 34, or both, provide motive force to the RGB 28 and the RGB 28, in turn, provides motive power to the propulsor 26. The AGB 30 is in communication with the gas turbine engine 22 and the second electric motor 36 ("EM") is in communication with the AGB 30. Accessory gear boxes are well known and the present disclosure is not limited to any particular accessory gear box configuration.

The electrical power motive system 24 includes the first electric motor 34, the second electric motor 36, a first inverter 38, a second inverter 39, an electrical distribution bus 40, and an electrical energy storage device 42. The electrical power motive system 24 may include an electric generator 44, but does not require an electric generator.

The first electric motor 34 is in communication with the RGB 28 and can be mounted on the RGB 28 directly as shown in FIG. 1. Alternatively, the first electric motor 34 may be engaged with an output shaft of the thermal engine 22. The first electric motor 34 is configurable in a drive mode to provide motive force to the propulsor 26 or in generator mode to produce electrical energy. In the drive mode, the first electric motor 34 is controlled to provide motive force to the propulsor 26 via the RGB 28. In the generator mode, the first electric motor 34 may be driven by the rotation of the propulsor drivetrain to produce electrical energy. In some embodiments, the first electric motor 34 may also be controlled to be in an idle mode, wherein the first electric motor 34 neither provides motive force nor produces electrical energy. The first electric motor 34 may be selected to be sufficiently powerful to drive the propulsor 26 during all flight conditions independent of the gas turbine engine 22. In such a case, the first electric motor 34 may provide all of the motive force for driving the propulsor 26.

The second electric motor 36 is coupled with the AGB 30 and the AGB 30 is in communication (directly or indirectly) with a compressor rotational shaft of the gas turbine engine 22. As will be detailed hereinafter in greater detail, the second electric motor 36 may be controlled to provide motive force to the AGB 30, and the AGB 30 transfers that motive force to the compressor 23 of the gas turbine engine 22. In some instances, the second electric motor 36 may be configured to operate as an electrical generator driven by the AGB 30; e.g., operate as a generator when the second electric motor 36 is not being used to provide motive force to the gas turbine engine 22.

Figure 2:
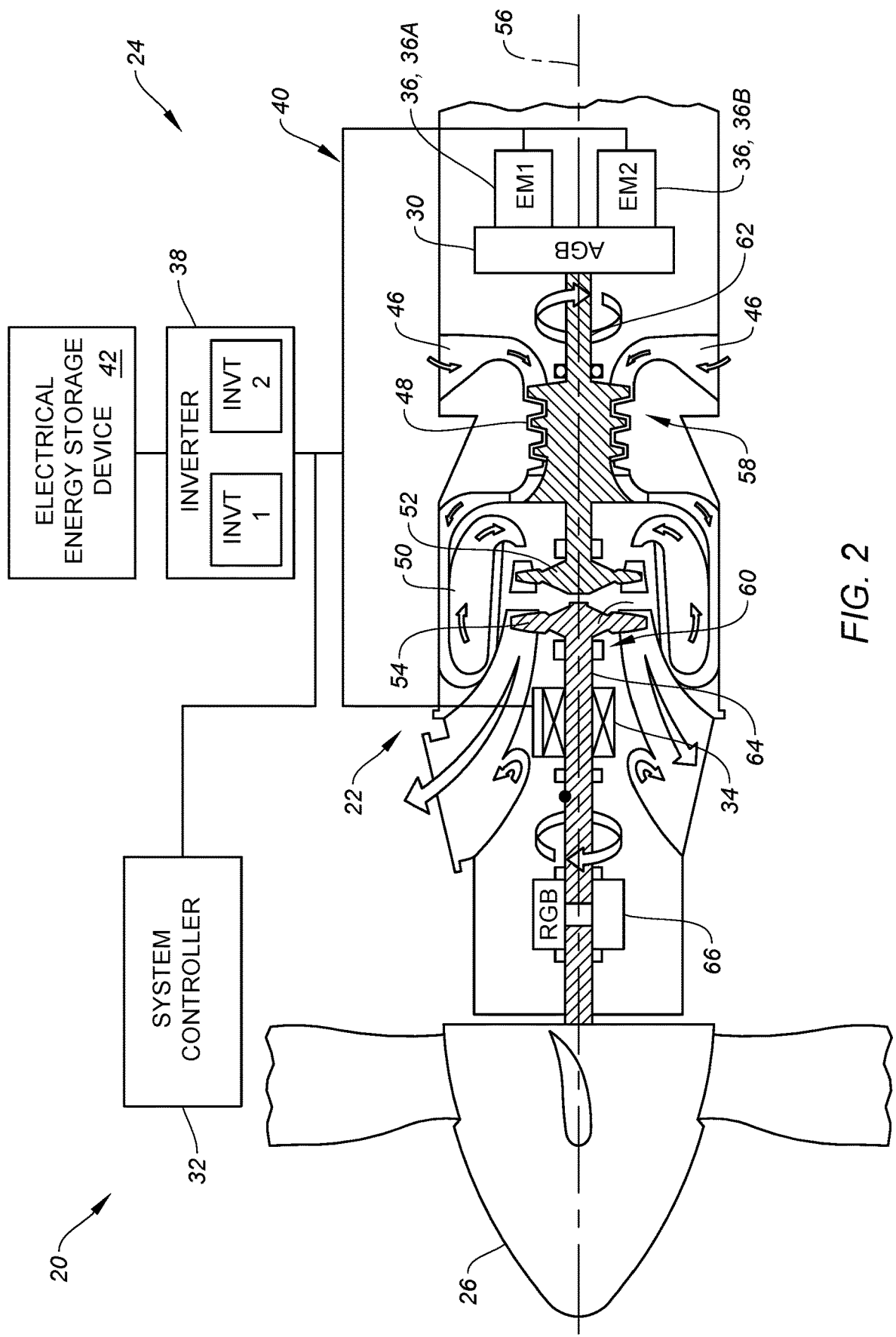
FIG. 2 is a diagrammatic view of a present disclosure hybrid-electric propulsion system embodiment.

The first inverter 38 may be configured to control (e.g., regulate) the electrical energy (e.g., AC voltage and/or frequency) supplied to the first electric motor 34 from the electrical distribution bus 40. Similarly, the second inverter 39 may be configured to control (e.g., regulate) the electrical energy (e.g., AC voltage and/or frequency) supplied to the second electric motor 36 from the electrical distribution bus 40. The first and second inverters 38, 39 may be independent of one another, or in some embodiments they may be integral with a single inverter that is designed to control more than one motor. FIG. 2 diagrammatically illustrates an inverter 38 having a first inverter (INVT 1) and a second inverter (INVT 2) to symbolize that the inverter 38 may be configured to separately control the first electric motor 34 and the second electric motor 36. The inverter 38 may be configured to measure or otherwise determine a rotation speed of and/or a torque produced by the electric motor 34, 36. By controlling the electrical energy supplied to the electric motor 34, 36, the inverter 38 may control the electric motor 34, 36 to operate at a controlled rotation speed and/or torque. For example, the inverter 38 may control the electric motor 34, 36 to apply a positive torque, a negative torque (e.g., the electric motor 34, 36 operating as a generator and applying a rotational load), or no torque to a system component. The inverter 38 may include one or more sensors (or control logic-neither shown) configured to measure a rotation speed and/or torque of the electric motor 34, 36, or the inverter 38 may indirectly infer the speed from observed current and voltage signals and adjust its AC voltage to accomplish the target torque, without measuring or estimating its torque. Torque feedback is not required if the inverter 38 is reliably able to deliver the torque requested by the system controller 32. The inverter 38 may include an electronic control system that includes a processor connected in signal communication with a non-transitory memory storing instructions, which instructions when executed by the processor, cause the inverter 38 and/or its processor to control a rotation speed and/or torque of the electric motor 34, 36. The inverter 38 may be independent of and in signal communication with the system controller 32, or the inverter 38 may be partially or fully integral with the system controller 32 (or other controller), or the system controller 32 may be partially or fully integral with the inverter 38. The inverter 38 is not limited to any particular configuration or electronic control architecture.

The electrical distribution bus 40 is configured to provide electrical communication between components of the electrical power motive system 24; e.g., the first electric motor 34, the inverter 38, the electrical energy storage device 42, the second electric motor 36, and the electric generator 44 if included. In some embodiments, a single electrical distribution bus 40 may provide electrical communication between components of the electrical power motive system 24. In some embodiments, the electrical distribution bus 40 may include independent portions; e.g., a first electrical distribution bus portion that provides electrical communication between a first set electrical power motive system 24 components, a second electrical distribution bus portion that provides electrical communication between a second set electrical power motive system 24 components, and so on. The present disclosure is not limited to any particular electrical distribution bus 40 configuration.

The electrical energy storage device 42 may be any device that can be charged and discharged. A non-limiting example of an electrical energy storage device 42 that can be charged and discharged is a battery. A battery may be a single battery, or a plurality of battery modules (e.g., battery packs), battery cells, and/or the like electrically connected together in series and/or parallel as necessary to configure the battery with the desired electrical characteristics (e.g., voltage output, current output, storage capacity, etc.). The battery (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The present disclosure is not limited to any particular battery configuration. Another example of an electrical energy storage device 42 that can be charged and discharged is a supercapacitor.

The electrical power motive system 24 may include additional electrical components such as, but not limited to, breakers, contactors, transformers, alternating current (AC) to direct current (DC) conversion components, DC to AC conversation components, and the like.

In those system embodiments that include a generator 44, the generator 44 may be configured to supply electrical energy to the electrical power motive system 24. The generator 44 is in electrical communication with the electrical distribution bus 40 to supply electrical energy to the system 20 and/or the aircraft.

The system controller 32 may include one or more processors connected in signal communication with a memory device. The processor may include any type of computing device, computational circuit, processor(s), CPU, computer, or the like capable of executing a series of instructions that are stored in the memory. Instructions can be directly executable or can be used to develop executable instructions. For example, instructions can be realized as executable or non-executable machine code or as instructions in a high-level language that can be compiled to produce executable or non-executable machine code. In addition, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the gas turbine engine 22 and/or the electrical power motive system 24 to accomplish the same algorithmically and/or by coordination of the gas turbine engine 22 and/or the electrical power motive system 24 components. The memory may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled with the system controller 32. The system controller 32 may include, or may be in communication with, an input device that enables a user to enter data and/or instructions, and may include, or be in communication with, an output device configured, for example to display information (e.g., a visual display or a printer), or to transfer data, etc. Communications between the system controller 32 and other electrical and/or electronic components (e.g., controllers, sensors, etc.) may be via a hardwire connection or via a wireless connection. A person of skill in the art will recognize that portions of the system controller 32 may assume various forms (e.g., digital signal processor, analog device, etc.) capable of performing the functions described herein.

The system controller 32 may be independent of and in signal communication with the inverter 38, or the inverter 38 may be partially or fully integral with the system controller 32, or the system controller 32 may be partially or fully integral with the inverter 38. The functions of the system controller 32 described herein may be performed by the system controller 32 itself, or may be performed in combination with or cooperatively with one or more other controllers (e.g., the inverter 38, an engine controller, an electric motor controller, an avionics system such as a flight control computer, or any combination thereof). The system controller 32 may include or functionally be a part of an electronic engine controller (EEC) for the gas turbine engine 22. The EEC may control operating parameters of the gas turbine engine 22. In some embodiments, the EEC may be part of a full authority digital engine control (FADEC) system for the present disclosure HEP system 20. To facilitate the description herein and unless otherwise specifically noted, the functionality of the present disclosure is described herein as being performed by the system controller 32. The present disclosure is not, however, limited to being performed by a singular, independent system controller 32.

The propulsor 26 may include a plurality of rotor blades (e.g., propeller blades, helicopter rotor blades, or a tilt-engine rotor blades, or the like). Rotor blades may be utilized in fixed-pitch rotor blade configuration or a variable-pitch rotor blade configuration. In a fixed-pitch rotor blade configuration the amount of thrust produced by the rotor blades is a function of the rotation speed of the rotor blades. In a variable-pitch rotor blade configuration, the pitch of the rotor blades can be selectively varied to produce a change in the amount of thrust produced by the rotor blades without changing the rotational speed of the rotor blades.

FIG. 2 diagrammatically illustrates a second present disclosure HEP system 20 embodiment that includes a gas turbine engine 22, a reduction gear box (RGB 28), a propulsor 26, a system controller 32, an electrical power motive system 24, and an accessory gear box (AGB 30).

The gas turbine engine 22 includes an air inlet 46, a compressor 48, a combustor 50, a high-pressure turbine 52, and a power turbine 54. The air inlet 46, the compressor 48, the combustor 50, the high-pressure turbine 52, and the power turbine 54 are arranged along an axial centerline 56 (e.g., a rotational axis) of the gas turbine engine 22. The gas turbine engine 22 may be described as having a first rotational assembly 58 and a second rotational assembly 60. The first rotational assembly 58 and the second rotational assembly 60 are mounted for rotation about the axial centerline 56. The gas turbine engine 22 has a "free turbine" configuration in which power for aircraft propulsion is extracted by the second rotational assembly 60 downstream of (e.g., from the exhaust of) the first rotational assembly 58. The present disclosure, however, is not limited to a free turbine configuration.

The terms "forward" and "aft" are used herein to indicate position along the axial centerline 56; referring to the turbine engine shown in FIG. 2, the power turbine 54 is disposed forward of the high-pressure turbine 52, and the high-pressure turbine 52 is disposed aft of the power turbine 54. The term "upstream" and "downstream" are used to indicate position within the gas path of the gas turbine engine 22; e.g., the high-pressure turbine 52 is upstream of the power turbine 54 and the power turbine 54 is downstream of the high-pressure turbine 52 because core gas exits the high-pressure turbine 52 and enters the power turbine 54. The term "radial" refers to a direction that is perpendicular to the axial centerline and may be used herein to indicate position relative to the axial centerline; e.g., a first component positioned "radially inward" of a second component is disposed closer to the axial centerline than the second component, and conversely the second component is disposed "radially outward" of the first component.

Referring again to FIG. 2, the first rotational assembly 58 includes a first shaft 62 connecting the compressor 48 to the high-pressure turbine 52. The second rotational assembly 60 includes a second shaft 64 connected to the power turbine 54. The second shaft 64 may be directly or indirectly connected to the propulsor 26. For example, the second shaft 64 may be configured to rotatably drive the propulsor 26 via a reduction gear box 66. The reduction gear box 66 may be configured to drive the propulsor 26 at a reduced rotational speed relative to the rotational speed of the second shaft 64.

During operation of the gas turbine engine 22 shown in FIG. 2, ambient air enters the gas turbine engine 22 through the air inlet 46 and is directed into the compressor 48. The ambient air is compressed within the compressor 48 and is directed into the combustor 50. Fuel is injected into the combustion and is mixed with the compressed air to provide a fuel-air mixture. This fuel-air mixture is ignited, and combustion products thereof flow through and sequentially cause the high pressure turbine 52 and the power turbine 54 to rotate. The rotation of the high pressure turbine 52 drives rotation of the first rotational assembly 58 and the rotation of the power turbine 54 drives rotation of the second rotational assembly 60. The second rotational assembly 60, in turn, further drives rotation of the propulsor 26 to provide propulsion (e.g., thrust) for the aircraft. As will be detailed herein, motive power to the propulsor 26 may also be provided by an electric motor (e.g., first electric motor 34). Combustion exhaust gas flowing past the power turbine 54 is directed out of the gas turbine engine 22 (e.g., through an exhaust).

The accessory gear box (AGB 30) is in driving communication with the first shaft 62. As indicated above, accessory gear boxes are well known and the present disclosure is not limited to any particular accessory gear box configuration. As will be detailed herein, a second electric motor 36 ("EM"—or a pair of second electric motors 36A, 36B as shown in FIG. 2) may be in communication with the AGB

30. Alternatively, a second electric motor 36 may be directly mounted on the first shaft 62 or mounted to be rotationally driven by the compressor 48 or the high pressure turbine 52 thereby obviating the gear reduction of the AGB 30.

The electrical power motive system 24 in the embodiment of FIG. 2 includes a first electric motor 34, a second electric motor 36 (or a pair of second electric motors 36A, 36B for redundancy), an inverter 38, an electrical distribution bus 40, and an electrical energy storage device 42. The inverter 38, electrical distribution bus 40, and electrical energy storage device 42 may be configured as described above.

In this present disclosure HEP system 20 embodiment, the first electric motor 34 is configured to apply a motive force to the second rotational assembly 60. For example, the first electric motor 34 may be directly or indirectly coupled to the second shaft 64 to drive the second shaft 64 by applying a motive force to the second shaft 64. The first electric motor 34 is diagrammatically shown in FIG. 2 in direct contact with the second shaft 64. However, the present disclosure is not limited to this exemplary configuration of the first electric motor 34. For example, the first electric motor 34 may be indirectly connected to the second shaft 64 by a gear box, a clutch, or the like. Accordingly, the first electric motor 34 may be configured to apply a motive force to the second rotational assembly 60 to facilitate driving the propulsor 26 via the second rotational assembly 60. For example, the first electric motor 34 in combination with the power turbine 54 may provide the motive force for driving the propulsor 26. As will be detailed herein, the first electric motor 34 may also be configured to operate as an electrical generator driven by rotation of the second shaft 64. Accordingly, the first electric motor 34 may also operate as a rotational load on the second shaft 64 to slow the rotational speed of the second shaft 64 and/or to generate electrical energy. The first electric motor 34 may be selected to be sufficiently powerful to drive the propulsor 26 during all flight conditions independent of the power turbine 54. In such a case, the first electric motor 34 may provide all of the motive force for driving the propulsor 26.

The second electric motor 36 (or motors 36A, 36B) may be coupled with the accessory gear box (AGB 30), or mounted elsewhere as described above (e.g., on the first shaft 62, or engaged with the compressor 48 or the high pressure turbine 52). The second electric motor 36 may be configured to provide motive force to the first rotational assembly 58, including the first shaft 62 that connects the compressor 48 to the high-pressure turbine 52. Details regarding use of the second electric motor 36 to provide motive force to the first rotational assembly 58, and more specifically to the compressor 48, are provided herein. In some instances, the second electric motor 36 (or motors 36A, 36B) may be configured to operate as an electrical generator driven by rotation of the first shaft 62 via the AGB 30; e.g., operate as a generator when the second electric motor 36 is not being used to provide motive force to the first rotational assembly 58.

In those system embodiments that include a dedicated generator 44, the generator 44 may be configured to supply electrical energy to the electrical power motive system 24. The generator 44 is in electrical communication with the electrical distribution bus 40 to supply electrical energy to the system 20 and/or the aircraft.

The propulsor 26 may be configured as described above.

The present disclosure provides a system 20 and method for improved control of a gas turbine engine 22 during low engine power settings. Examples of where improved gas turbine engine 22 control would be desirable are as follows.

As a first example, the fuel burn rate of a conventional gas turbine engine 22 at very low compressor speeds is normally very inefficient. This is particularly true, for example, in a conventional helicopter engine during descent. The present disclosure may be used to improve the fuel efficiency of a gas turbine engine 22 at very low compressor speeds, and/or enable a reduction of the turbine gas temperature of the engine at very low compressor speeds which may improve engine life. As another example, many conventional gas turbine engines have a rate of power increase at a low engine power setting that is slower/more limited as compared to the rate of power increase possible at high engine power setting. The relatively slow/limited rate of power increase can limit the responsiveness of the gas turbine engine 22. In similar fashion, a person of skill in the art will recognize that conventionally accelerating a gas turbine engine 22 by increasing the fuel flow does not produce instantaneous acceleration; i.e., there is a lag between the moment of acceleration (e.g., the pilot changing the engine power setting by actuating the throttle control) and the engine 22 actually migrating to the changed power setting. The present disclosure may be used to improve rate of power increase available at a low engine power setting (or to mitigate lag) and thereby improve the responsiveness of the engine 22. An aircraft operational example of where an improved rate of power increase at a low engine power setting would be beneficial is an aircraft aborted landing maneuver. An aircraft aborted landing maneuver is also sometimes referred to as a go-around maneuver, which refers to a maneuver where the pilot decides to abort a landing attempt and, in an emergency condition, might require a rapid increase in power to stop descending and avoid an obstacle. A helicopter flare maneuver refers to a technique performed prior to touchdown of the helicopter, wherein the pilot controls the aircraft (e.g., by adjusting the rotor blade pitch, or the like) to reduce the aircraft vertical and horizontal speed to facilitate the touchdown. In a helicopter (or other rotary powered aircraft), the flare maneuver may involve accelerating the gas turbine engine 22 from a low power setting (i.e., descent) to provide increased power quickly to achieve the decrease in aircraft vertical and horizontal speed.

As described above, the present disclosure system may include a first electric motor 34 that provides motive force to the propulsor 26. During low power setting portions of an aircraft flight pattern (e.g., descent), the first electric motor 34 may be controlled to provide limited or no motive force to the propulsor 26 and the propulsor motive force is predominantly or entirely provided by the gas turbine engine 22. In those instances wherein the first electric motor 34 is controlled to provide no motive force to the propulsor 26, the first electric motor 34 may be controlled to, but is not required to, function as a generator, producing electrical energy that may be fed back into the electrical distribution bus 40 to charge the electrical energy storage device 42, or to power other electrical components within the electrical power motive system 24; e.g., the second electric motor 36.

In the present disclosure, the second electric motor 36 is controlled (e.g., via stored instructions) to selectively provide motive force to the compressor 23, 48 of the gas turbine engine 22 (e.g., during a low engine power setting), thereby applying torque to the compressor 23, 48. In the HEP system 20 embodiment shown in FIG. 1, for example, the second electric motor 36 is coupled with the AGB 30 and the AGB 30 is in communication (directly or indirectly) with the compressor 23 rotational shaft (not shown) of the gas turbine engine 22. The second electric motor 36 is controlled to provide motive force to the AGB 30 and the AGB 30 transfers that motive force to the compressor 23 of the gas turbine engine 22. In the HEP system 20 embodiment shown in FIG. 2, for example, the second electric motor 36 is in communication with the first rotational assembly 58 either directly or indirectly through the AGB 30. In configurations wherein the second electric motor 36 is engaged with the AGB 30, the second electric motor 36 is controlled to provide motive force to the AGB 30 and the AGB 30 provides motive force to the first rotational assembly 58 of the gas turbine engine 22, including the compressor 48 thereof. The electrical power required to power the second electric motor 36 may be produced by the first electric motor 34 functioning as a generator, or from the electrical energy storage device 42, or from a dedicated generator 44, or any combination thereof.

The motive force/torque to the compressor 23, 48 augmentation may be applied in a manner that increases the rotational speed of the compressor 23, 48 to a level ("$N_{assist}$") above the rotational speed ("$N_{normal}$") it would be operating at for the given fuel flow ($N_{assist} > N_{normal}$), and/or the augmentation may be applied in a manner that increases the torque applied to the compressor 23, 48 to a level ("$T_{assist}$") above the torque ("$T_{normal}$") that is otherwise applied to the compressor 23, 48 via the connected turbine 27, 52 at the given fuel flow ($T_{assist} > T_{normal}$).

In terms of improving the fuel burn rate of a gas turbine engine 22 at very low compressor speeds, the present disclosure provision of motive force to the compressor 23, 48 of the gas turbine engine 22 via an electric motor 36 (i.e., the augmentation) may be utilized to permit the gas turbine engine 22 to operate at the same power setting or a specific low compressor speed with a decreased fuel flow rate; e.g., the required power from the turbine normally driving the compressor may be decreased because a portion of the motive force driving the compressor is provided by the second electric motor 36. The decreased power requirements on the turbine may be satisfied with a decreased fuel flow rate. The additional torque from the second electric motor 36 has a similar effect as improved turbine efficiency, with the resulting effect of reducing turbine temperatures, which can improve turbine operating life. An additional benefit derived from using torque from the second electric motor 36, is that the compressor speed can be maintained at a higher speed than would otherwise be the case with combustion alone, which means that when called upon to suddenly accelerate to a high speed it is already part of the way to that higher speed target when the fuel flow is increased. This can help to avoid compressor speeds from which the normal engine has limited acceleration capability.

Also in terms of improving the rate of power increase, the present disclosure provision of motive force to the compressor 23, 48 of the gas turbine engine 22 via an electric motor 36 (i.e., the augmentation) may be used to augment compressor performance to mitigate a slow rate of power increase or lag that may be associated with conventional engine acceleration. As indicated above, there is a lag between the moment of engine acceleration request and the engine's response to that request, and the acceleration process is closely controlled to respect stall/surge margins and temperature limits. Conventionally, the gas turbine engine 22 response to the acceleration request includes increasing the fuel flow into the combustor. Increasing the fuel flow into the combustor generates greater pressure and torque from the turbine which enables it to produce more torque than is consumed by the compressor, resulting in acceleration, but this over-fueling also increases the pressure ratio across the compressor, which has a maximum possible permitted value to avoid compressor stall. Acceleration in this example may therefore be limited by compressor stall margin, but acceleration can also be limited by turbine temperature, since turbine temperature is also increased by over-fueling during acceleration. The present disclosure's use of an electric motor (e.g., the second electric motor 36) to provide motive force to the compressor 23, 48 of the gas turbine engine 22 increases the rotational speed (and/or torque) of the compressor 23, 48 and therefore the turbine 27, 52 connected by a shaft therebetween. The electric motor 36 can be controlled to respond (and thereby provide the augmentation) much more rapidly than the gas turbine engine 22 can respond. As a result, the slow rate of power increase or lag associated with a conventional gas turbine engine 22 is diminished and engine acceleration response is improved. The improvement in engine acceleration response and diminution of lag may provide benefits in aircraft handling and performance. As described above, a helicopter flare maneuver requires a quick acceleration from an engine low power setting. The present disclosure facilitates the quick acceleration; e.g., to provide power quickly, the engine 22 can rapidly increase fuel flow without having to wait for the compressor speed to accelerate from a minimum speed or from a speed lower than the conventional engine's idle speed.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted is a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A hybrid-electric propulsion (HEP) system, comprising:
   a propulsor;
   a compressor;
   a gas turbine engine, the gas turbine engine having a free turbine configuration including a first shaft connecting a high-pressure turbine to the compressor, and a second shaft connecting a power turbine to the propulsor, wherein the first shaft and the second shaft are different from each other and not mechanically connected to each other, and wherein each of the first shaft and the second shaft is aligned with and configured to rotate about an axial centerline of the gas turbine engine;
   an electrical power motive system having a first electric motor, a second electric motor, a first inverter, and a second inverter; and
   a system controller;
   wherein the gas turbine engine is configured to provide motive force to the propulsor;
   wherein the first electric motor is configurable in a drive mode to provide motive force to the propulsor or in generator mode to produce electrical energy;
   wherein the second electric motor is in communication with the compressor and the second shaft; and
   wherein the system controller is in communication with the gas turbine engine, the first inverter, the second inverter, and a non-transitory memory storing instructions, which instructions when executed cause the system controller to control the second inverter to operate the second electric motor to provide a motive force to the compressor of the gas turbine engine during a low power setting of the gas turbine engine.

2. The HEP system of claim 1, wherein the gas turbine engine and the first electric motor are disposed in a parallel configuration.

3. The HEP system of claim 2, wherein the HEP system further includes a reduction gear box and in the parallel configuration both the gas turbine engine and the first electric motor are in communication with the reduction gear box.

4. The HEP system of claim 1, wherein the instructions when executed cause the system controller to control the first inverter to operate the first electric motor in the generator mode when the second inverter is controlled to operate the second electric motor to provide motive force to the compressor of the gas turbine engine.

5. The HEP system of claim 1, wherein the gas turbine engine has a first rate of power increase at the low power setting without the motive force from the second electric motor and has a second rate of power increase at the low power setting with the motive force from the second electric motor, wherein the second rate of power increase is greater than the first rate of power increase.

6. The HEP system of claim 1, wherein the gas turbine engine has a first rate of power increase limit between an engine acceleration request and an engine response to the request during the low power setting without the motive force from the second electric motor, and a second rate of power increase limit between the engine acceleration request and the engine response to the request during the low power setting with the motive force from the second electric motor, wherein the first rate of power increase limit is greater than the second rate of power increase limit.

7. The HEP system of claim 1, further comprising an accessory gearbox (AGB) in communication with the compressor of the gas turbine engine and the second electric motor.

8. The HEP system of claim 1, wherein an accessory gearbox (AGB) is in communication with the first shaft.

9. The HEP system of claim 1, wherein the gas turbine engine has an axial centerline and the high-pressure turbine, the power turbine, the first shaft, and the second shaft are rotatable about the axial centerline.

10. A method of controlling a hybrid-electric propulsion (HEP) system, the HEP system including a propulsor, a compressor, and a gas turbine engine, the gas turbine engine having a free turbine configuration including a first shaft connecting a high-pressure turbine to the compressor and a second shaft connecting a power turbine to the propulsor, wherein the first shaft and the second shaft are different from each other, and wherein each of the first shaft and the second shaft is aligned with and configured to rotate about an axial centerline of the gas turbine engine, and an electrical power motive system having a first electric motor, a second electric motor, a first inverter, and a second inverter, wherein the second electric motor is in communication with the compressor, the method including:
   controlling the gas turbine engine to provide motive force to the propulsor;

controlling the first electric motor to operate in a first mode providing motive force to the propulsor or to operate in a second mode not providing motive force to the propulsor; and controlling the second electric motor to provide motive force to the compressor of the gas turbine engine during a low power setting of the gas turbine engine.

11. The method of claim 10, wherein in the second mode the first electric motor operates as an electrical generator producing electrical energy.

12. The method of claim 11, wherein the first electric motor is controlled to operate in the second mode when the second electric motor is controlled to provide motive force to the compressor of the gas turbine engine during the low power setting of the gas turbine engine, wherein the electrical energy produced by the first electric motor is available for use by the second electric motor.

13. The method of claim 10, wherein the HEP system further includes a reduction gear box and the gas turbine engine and the first electric motor are in communication with the reduction gear box, and are disposed in a parallel configuration.

14. The method of claim 10, wherein the gas turbine engine has a first rate of power increase during the low power setting without the motive force from the second electric motor and has a second rate of power increase during the low power setting with the motive force from the second electric motor, wherein the second rate of power increase is greater than the first rate of power increase.

15. The method of claim 10, wherein the gas turbine engine has a first lag between an engine power increase request and an engine response to the power increase request during the low power setting without the motive force from the second electric motor, and a second lag between the engine power increase request and the engine response to the power increase request during the low power setting with the motive force from the second electric motor, wherein the first lag is greater than the second lag.

16. The method of claim 10, wherein an accessory gearbox (AGB) is in communication with the first shaft.

17. The method of claim 10, wherein in the second mode the first electric motor operates as an electrical generator producing electrical energy, and the method further comprising controlling the first electric motor when operating in the second mode to generate a total amount of electrical energy greater than an amount of electrical energy used by the second electric motor, and a providing a difference in said electrical energy between the total amount of electrical energy and the amount of electrical energy used by the second electric motor to an electrical energy storage device.

18. The method of claim 10, further comprising controlling the first electric motor operating in second mode to begin operating in the first mode when a propulsor power increase request is made.

19. The method of claim 10, further comprising providing said electrical energy from an electrical energy storage device to both the first inverter and second inverter simultaneously.

20. The method of claim 10, wherein electrical power required to power the second electric motor when controlling the second electric motor to provide motive force to the compressor of the gas turbine engine is produced by the first electric motor and an electrical energy storage device.

* * * * *